(12) United States Patent
Tyni et al.

(10) Patent No.: US 7,909,143 B2
(45) Date of Patent: Mar. 22, 2011

(54) ELEVATOR SYSTEM WITH POWER CONSUMPTION CONTROL

(75) Inventors: Tapio Tyni, Hyvinkää (FI); Jari Ylinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 740 days.

(21) Appl. No.: 11/907,811

(22) Filed: Oct. 17, 2007

(65) Prior Publication Data

US 2008/0105499 A1    May 8, 2008

Related U.S. Application Data

(63) Continuation of application No. PCT/FI2006/000145, filed on May 5, 2006.

(30) Foreign Application Priority Data

May 12, 2005    (FI) .................................... 20050504

(51) Int. Cl.
    *B66B 1/18*    (2006.01)
(52) U.S. Cl. ........................ 187/382; 187/247; 187/391
(58) Field of Classification Search .................. 187/247, 187/290, 293, 380–388, 391–393, 313
    See application file for complete search history.

(56) References Cited

U.S. PATENT DOCUMENTS

| | | | |
|---|---|---|---|
| 5,896,948 A | 4/1999 | Suur-Askola et al. | |
| 6,315,081 B1 | 11/2001 | Yeo | |
| 6,435,312 B2 * | 8/2002 | Tajima et al. | 187/290 |
| 6,439,347 B2 * | 8/2002 | Suga et al. | 187/290 |
| 6,672,431 B2 * | 1/2004 | Brand et al. | 187/382 |
| 6,827,182 B2 * | 12/2004 | Araki | 187/290 |
| 7,275,623 B2 * | 10/2007 | Tyni et al. | 187/382 |
| 7,416,057 B2 * | 8/2008 | Kostka | 187/382 |
| 7,540,355 B2 * | 6/2009 | Harkonen | 187/290 |
| 7,743,890 B2 * | 6/2010 | Nikovski et al. | 187/382 |
| 2003/0089556 A1 | 5/2003 | Eilinger | |

FOREIGN PATENT DOCUMENTS

| | | |
|---|---|---|
| FI | 115130 B | 3/2005 |
| JP | 2001-171921 A | 6/2001 |
| JP | 2003-146550 A | 5/2003 |
| WO | WO-02/066356 A2 | 8/2002 |

* cited by examiner

*Primary Examiner* — Jonathan Salata
(74) *Attorney, Agent, or Firm* — Birch, Stewart, Kolasch & Birch, LLP (57) ABSTRACT

The present invention pertains to a method for optimal routing of the elevators in an elevator system in a situation where the supply power received by the system is limited e.g. due to emergency power operation. In the invention, routes are optimized by using a cost function to which has been added a term containing the summed instantaneous power consumed. Power consumption is monitored in real time, and the elevators need a start permission from the control system. A route alternative that exceeds the power limit is penalized in the cost function by a so-called penal term. With the elevator routing obtained as a result, the instantaneous power consumed by the system remains continuously below the set power limit. Some call can thus be postponed to be served later. By the method of the invention, the number of elevators serving passengers in an emergency power situation can be varied dynamically.

20 Claims, 5 Drawing Sheets

ELEVATOR SYSTEM WITH POWER CONSUMPTION CONTROL

The present application is a continuing application of PCT/FI2006/000145, filed internationally on May 5, 2006, the entire contents of which are hereby incorporated by reference.

FIELD OF THE INVENTION

The present invention relates to optimal elevator routing in a situation where the energy to an elevator system is supplied by a stand-by power source or where the peak values of energy consumption of the elevator system are to be reduced.

BACKGROUND OF THE INVENTION

Allocation of the calls entered by elevator users to different elevators in an elevator system is one of the basic functions of the control of the system. The aim of allocation is to assign the calls to the elevator cars so as to optimize a desired parameter descriptive of the operating capacity of the elevator system. Traditionally, the most commonly used parameters include e.g. passenger waiting times and traveling times. Typically, from these times, mean values are calculated and distributions are determined. 'Calls' refers generally to all calls issued, i.e. both calls entered using up/down buttons on different floors and destination floor calls given in the elevator car. The former are landing calls and the latter are car calls. In addition, calls may be given using call input devices consistent with the so-called destination control method. In the destination control method, the elevator user lets the system know his/her traveling destination floor already in the elevator lobby via a call device, and in this case no separate call has to be input in the elevator car.

There are various call allocation methods, and each elevator manufacturer has its own methods for implementing cost-effective call allocation satisfying the elevator user. Each method naturally involves a number of characteristic parameters, which are used to influence the operation of the method. The control can be arranged e.g. so that in different traffic situations the parameter set best suited to each situation is employed. The aim of this is to allow the elevator system to adapt its operation as appropriate with respect to the prevailing traffic situation. An exceptional traffic situation may be e.g. a peak traffic condition, during which the system registers many simultaneous landing calls.

An efficient prior-art elevator allocation method is the use of genetic algorithms, especially in systems comprising several elevators. Genetic algorithms are described e.g. in Finnish patent specification FI112856B. Genetic algorithms do not guarantee that the absolutely optimal value is found, but the results obtained in practical applications are very close to that. In genetic algorithms, elevator routes can be encoded into different chromosomes, in which one gene determines an elevator customer and the elevator serving him/her. The position of the gene in the chromosome specifies the call, and the gene value tells the elevator serving the call. The system sets out e.g. from a randomly selected route alternative, to which are applied various genetic procedures, such as proliferation, crossbreeding and mutation. One generation at a time, new chromosomes are produced by these genetic procedures, and at the same time the chromosomes thus obtained are analyzed to decide whether they are eligible for further processing. Eligibility may mean, for instance, that a waiting time below a given value is obtained. Crossbreeding means combining two route alternatives at random to create one new route alternative. In mutation, the values of the genes of the chromosome are varied at random. At some stage, the chromosome results given by the algorithm converge, and from the last set of chromosomes processed, the best one in respect of eligibility is selected. The passengers are allocated to the elevators in accordance with the genes of the best chromosome.

The elevator system has to include precautions in case of unexpected interruption of the supply of electricity. When the normal power supply fails, the stand-by power generator of the building starts running—if the building has one. The stand-by power is normally not sufficient for the needs of the entire elevator group, but traditionally emergency power drive (EPD) of elevators is implemented by beforehand selecting the elevator or elevators to serve passengers during emergency operation.

When the power supply fails, the elevator with the passengers may stop between floors. After the emergency power generator has started running, the elevator group control system returns the elevators one by one in a previously defined order to a return floor (generally a lobby), where the passengers can get out of the elevator. After this returning operation, the above-mentioned predetermined elevators are put into normal service (so-called "full service lifts"). The number of such elevators to be taken in use depends on the power capacity of the emergency power generator and on the amount of power required by the elevators at the worst. The loads of the elevator car and counterweight is almost always unbalanced, and moving the elevator in the so-called light direction (empty car upwards, full car downwards) requires less power than moving it in the so-called heavy direction (empty car downwards, full car upwards). Present elevator drives are even able to restore potential energy stored in passengers back into the electric network, i.e. to function as generators when driving in the light direction or when the elevators are being decelerated.

Figure 1:
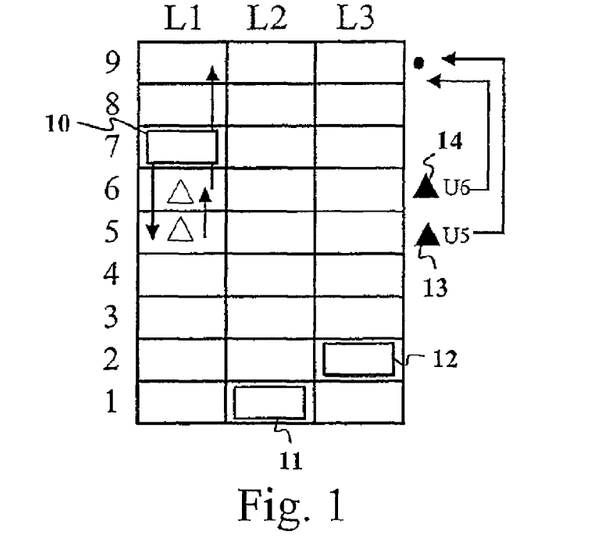
FIG. 1 presents as an example of prior art a group of three elevators with two active up calls, elevator 1 being operated by emergency power to serve calls.

FIG. 1 presents as an example of prior art a group of three elevators 10, 11, 12, where elevator 'L1' 10 is an elevator serving passengers in a situation of EPD operation. In this example, the speed of the elevator is 2.5 m/s, acceleration 0.8 m/s² and floor height 3.2 m. To reduce passenger waiting times, riding times of different types associated with elevator operation can be determined. These are presented in Table 1.

TABLE 1

| Elevator riding times | |
|---|---|
| Stage of operation | time [s] |
| Short ride (acceleration + deceleration) | 4 |
| Acceleration to full speed | 3 |
| Deceleration from full speed | 3 |
| Passage through floor at full speed | 1.25 |
| Stop at floor | 10 |

In the situation presented in FIG. 1, two calls are active, up calls at floors five and six (calls "U5" 13 and "U6" 14), from both of which one passenger is going to floor nine. On the basis of Table 1, the waiting time obtained for the active calls U5+U6 is 6.5 s+20 s=26.5 s.

Table 2 lists examples of power consumption during different stages of elevator operation with three different loads. The power consumption values are based on real data measured in connection with the use of a V3F-80 as power source.

Table 2. Power requirements of upward and downward travel with different loads. $P_{acc}$ is power consumption during acceleration, $P_{spd}$ is power consumption during constant-speed operation and $P_{dec}$ is power consumption during deceleration.

| Assumed passenger mass 75 kg | | | | |
|---|---|---|---|---|
| Number of passengers | Load [kg] | $P_{acc}$ [kW] | $P_{spd}$ [kW] | $P_{dec}$ [kW] |
| Upward travel | | | | |
| 0 | 0 | 5.6 | 2.5 | 0.4 |
| 1 | 75 | 6.4 | 2.5 | 0.4 |
| 2 | 150 | 7.3 | 2.4 | 0.4 |
| 3 | 225 | 8.4 | 2.3 | 0.4 |
| Downward travel | | | | |
| 0 | 0 | 21.9 | 16.7 | 3.3 |
| 1 | 75 | 19.9 | 13.9 | 3.3 |
| 2 | 150 | 18.0 | 11.5 | 3.3 |
| 3 | 225 | 16.4 | 9.5 | 3.3 |

Figure 2:
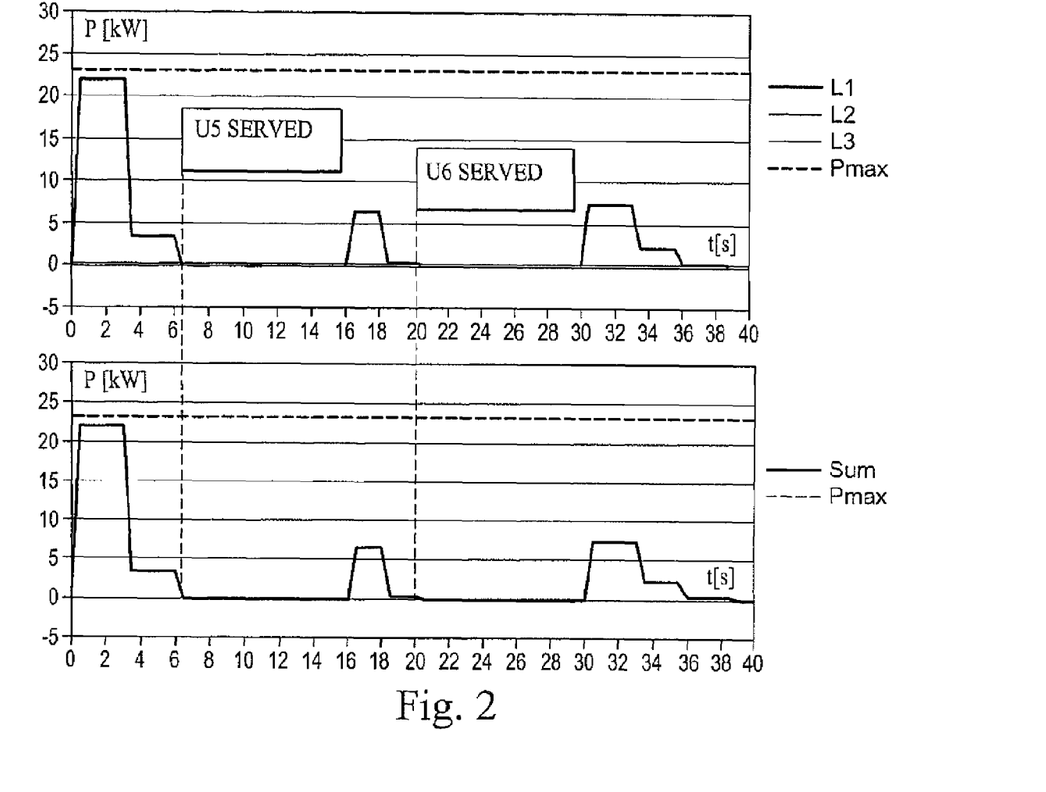
FIG. 2 represents the power requirement in the situation presented in FIG. 1.

FIG. 2 presents the power requirement of the elevators of FIG. 1 in one route alternative as a function of time. Since only elevator L1 is running, the total power consumption (Sum) of the elevator group is the same as the power consumption of elevator L1.

In the example, the maximum power required is 21.9 kW as an empty elevator is accelerating downwards (in the heavy direction), but this power value is smaller than the maximum power capacity of the emergency power generator.

Power and energy consumption are two different facets of resource management, where power is an instantaneous quantity whereas energy is a cumulative quantity. There are prior-art solutions where energy consumption is included in route optimization. Patent specification WO 02/066356 describes a system for controlling an elevator system wherein the energy consumed by the elevator system is minimized in such a way that a desired requirement regarding elevator passengers' service time is fulfilled on an average. In this method, a given service time of the elevator group is given a target value for call allocation. The service time used may be e.g. call time, passenger waiting time, traveling time or riding time.

Prior art is also represented by specification FI115130, which is an extension to the method description in specification WO 02/066356.

In other words, the control method optimizes two non-commensurable quantities of different types, i.e. waiting time and energy consumption. To make these quantities commensurable and mutually comparable, elevator routes R are selected in the method according to specification WO 02/066356 so as to minimize the cost term $$C = W_T T_N(R) + W_E E_N(R) \quad (1)$$

$T_N(R)$ is a normalized sum of call times for route alternative R, and correspondingly $E_N(R)$ is the normalized energy consumption caused by route alternative R. $W_T$ and $W_E$ are the weighting coefficients of the aforesaid cost terms, so that $$0 \leq W_T \leq 1 \text{ and } W_E = 1 - W_T. \quad (2)$$

Prior-art methods are designed to find routes on which the passenger waiting time produced by the elevator group and the power consumption of the elevators are suitably balanced. However, optimization of energy consumption does not guarantee that the elevators thus routed will not at some stage e.g. accelerate simultaneously in the so-called heavy direction. In other words, along the route there may occur large power spikes even if the total energy consumption for the route alternative in question is below the defined upper limit.

Figure 3:
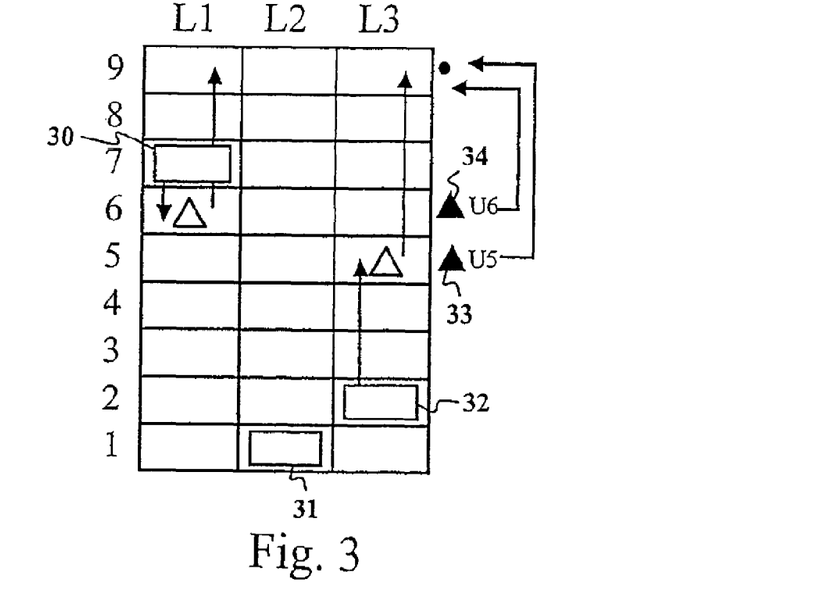
FIG. 3 shows the best routing alternative in respect of passenger waiting time, wherein elevator 1 serves call U6 and elevator 3 serves call U5.
Figure 4:
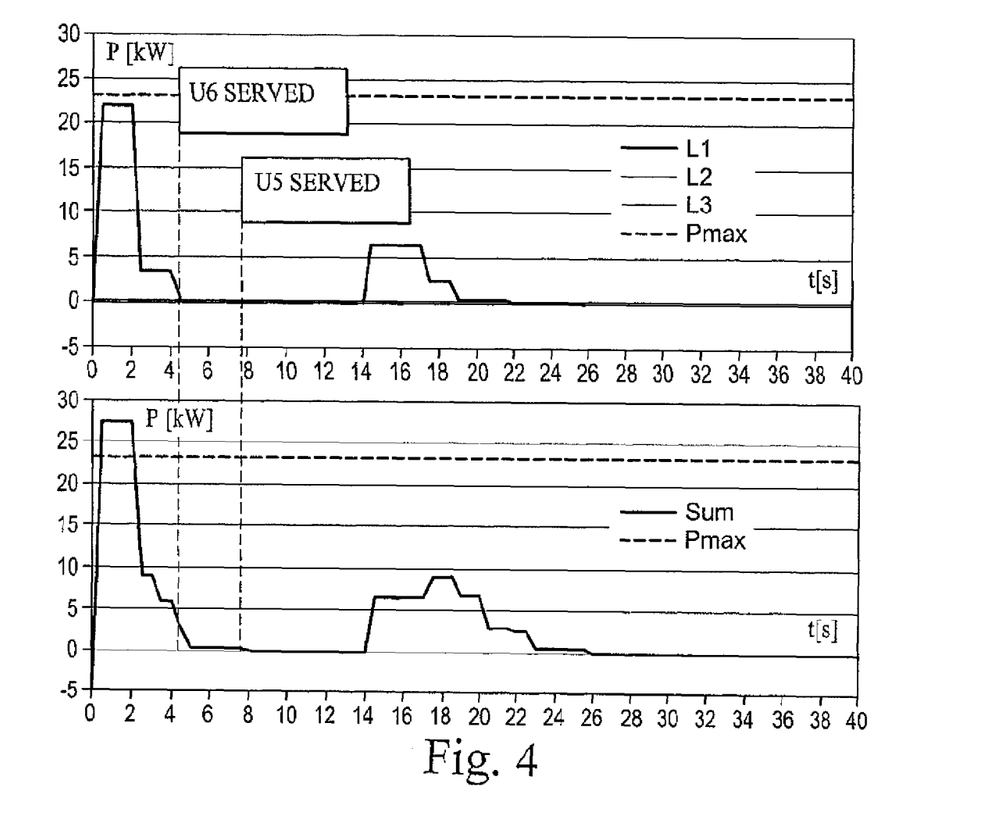
FIG. 4 represents the power requirement in the situation presented in FIG. 3.

As another example of prior art, and referring to the situation illustrated in FIG. 1, the best alternative in respect of passenger waiting times would be for elevator 1 to pick the call from floor 6 and for elevator 3 to serve the call from floor 5. This elevator routing alternative is presented in FIG. 3. The system comprises three elevators, elevator L1 30, elevator L2 31 and elevator L3 32. Calls currently active are an up call (U5) 33 from the fifth floor and an up call (U6) 34 from the sixth floor. The elevator movements are as shown in FIG. 3. It is to be noted that in this example both passengers having entered a call want to get to floor nine. In this situation, elevator L2 31 remains at rest and is not involved in serving the calls. The power requirement according to this routing is illustrated in FIG. 4. As can be seen from FIG. 4, in the best route alternative in respect of waiting times, the power required in the early part of the routing exceeds the capacity of the emergency power generator. The overall waiting time in this routing alternative is 4.5 s+7.5 s=12 s. Unfortunately, this routing alternative is not acceptable because the maximum power of the emergency power generator is exceeded.

OBJECT OF THE INVENTION

The object of the present invention is to route the elevators in an elevator system in an optimal manner in a situation where the maximum power consumed by the system is limited, such as e.g. during operation by emergency power.

BRIEF DESCRIPTION OF THE INVENTION

The method of the invention relates to a method for controlling an elevator group when the maximum power consumption is limited. The elevator group may comprise at least one elevator, and call allocation in the elevator group may be controlled by a control system. The method involves considering, on the basis of active calls and the states of the elevators at the instant of consideration a possible route alternative for the elevators. The method also entails defining a cost function containing at least one cost term, each of which comprises a quantity relating to the operation of the elevator system. Once the cost function is defined, a cost term that comprises the instantaneous power consumed by the elevator system may be added to the cost function. The method also entails setting a maximum limit for the power; allocating elevators to the calls in such a way that the cost function is minimized and that the set maximum power limit will not be exceeded at any instant of consideration in the route alternative; and giving an elevator allocated to a call a start permission from the control system before departure of the elevator, if taking the said elevator into use will not result in exceeding the set maximum power limit.

The system of the invention relates to a system for controlling an elevator group when the maximum power consumption is limited. The system may comprise at least one elevator; a control system for controlling the allocation of calls in the elevator group; and a model of the elevator system. Embodiments of the system may include an optimizer for considering a possible route alternative for the elevators on the basis of active calls and the states of the elevators at the instant of consideration; and defining a cost function, wherein the cost function contains at least one cost term, each of which comprises a quantity relating to the operation of the elevator system. Embodiments of the system may also include a controller of power for adding to the cost function a cost term that comprises the instantaneous power consumed by the elevator system; and setting a maximum power limit. In some embodiments, the optimizer allocates calls to the elevators in such a way that the cost function is minimized and that the set maximum power limit will not be exceeded at any instant of consideration in the route alternative. In further embodiments, the controller of power gives an elevator allocated to a call a start permission before departure of the elevator, if taking the said elevator into use will not result in exceeding the set maximum power limit.

Inventive embodiments are also presented in the description part and drawings of the present application. The inventive content disclosed in the application can also be defined in other ways than is done in the claims below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

The present invention describes a method for controlling an elevator group in a situation where the maximum power consumption of the system must be or is to be limited. The system comprises at least one elevator, and call allocation is controlled by a control system. The method involves considering a route alternative that can be inferred by prior-art methods from elevator states at the instant considered and from existing calls. Naturally there are many possible route alternatives, but a cost prognosis is performed for one selected route at a time. After this, a cost function is defined, containing at least one so-called cost term. A cost term consists of a quantity that is interesting in regard of elevator operation and a weighting coefficient for that quantity. In prior art, the quantities thus used have included call times, waiting times, traveling times and/or riding times either for one passenger or as a mean value for all passengers, or a cumulative elevator cars of the elevator system.

The present invention combines the cost function with the instantaneous power consumption of the system. An upper limit is set for the instantaneous power consumption. The cost function is minimized by including in the function a so-called penal term if the instantaneous power consumed at some stage in the routing of elevators exceeds the set maximum limit. From this it follows that in practice the optimized route never exceeds the maximum power limit. In addition, in an example of the invention, the cost function is minimized by a boundary condition set for at least one desired quantity. Further, the present invention provides that the elevators need a start permission before setting out to serve a call. A start permission is granted if the departure of the elevator in question will not result in exceeding the set maximum power limit.

In the present invention, the penal term of the cost function is directly proportional to the instantaneous maximum power consumed by the route in question.

In an embodiment of the present invention, previously known principles of genetic algorithms are used. To limit the maximum power, one or more elevators can be excluded from service and set into stand-by mode. At the algorithm level, this can be implemented by defining a gene value as empty when a call is left waiting for later service.

In the present invention, before a maximum power limit is introduced, the power requirement of the elevators for both upward and downward travel is determined as a function of the size of the load. The number of elevators in service can thus be varied dynamically according to the states of the elevators and the traffic situation, taking into account the power requirements known to the system.

The method of the invention can be applied during emergency power operation of the elevator system, in a situation where the external power supply is disturbed or completely interrupted. A second application is a situation where the peaks of consumed power are to be reduced in order to achieve cost savings.

Traditional emergency power operation is reliable and stable in respect of implementation, but it hardly takes into account the inherent asymmetry of the elevator as regards power consumption with different loads and traveling directions. The commonest situation is that during emergency power operation only one elevator can be kept running in normal service. Naturally the transportation capacity of the elevator group collapses during emergency power operation, but it is possible to try to improve the service at least a little by selecting elevators dynamically for service according to the traffic situation and the state of the elevator group within the framework of the power available.

By additionally applying a maximum power limit, route optimization can be used to find more balanced routes in respect of waiting times, energy consumption and peak power levels, and in this way the behavior of the elevator group can be held better under control than before.

DETAILED DESCRIPTION OF THE INVENTION

As the power consumption needs of the elevators are known, it is possible to control the elevator group even during emergency power operation in more versatile ways than by just simply putting certain predetermined elevators into normal service. The power requirements of the elevators being known, the elevator group can be controlled in such a way that the number of elevators in service varies dynamically according to the states of the elevators and the traffic situation. In addition, the essential condition, i.e. the instantaneous maximum power value can be continuously kept below the desired limit.

Figure 5:
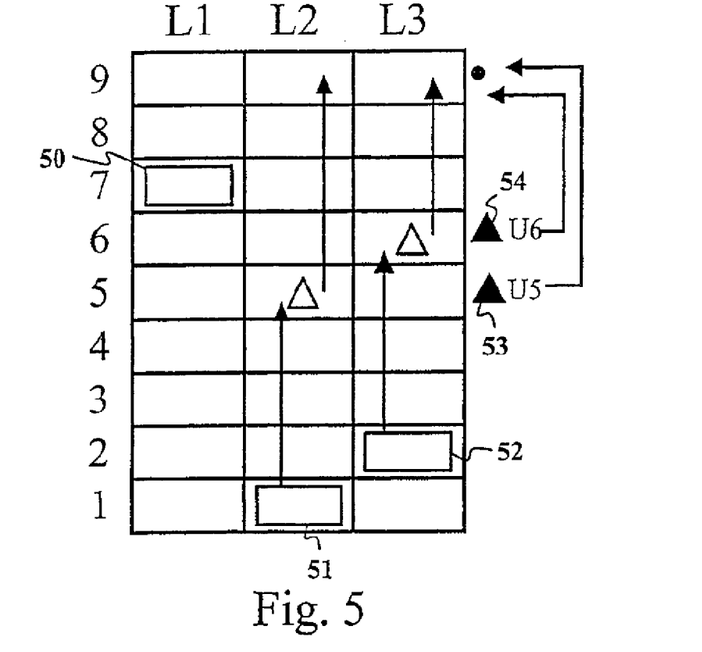
FIG. 5 presents a routing alternative that fulfills the power limit, with elevator 2 serving call U5 and elevator 3 serving call U6.

FIG. 5 represents a routing alternative according to the invention with the same elevator states 50, 51, 52 and active calls 53, 54 as in FIGS. 1 and 3. In the routing obtained as a final result, elevator L2 51 serves call U5 53 and elevator L3 52 serves call U6 54, and this routing fulfills the maximum power condition. With this routing, the total waiting time is 18 s, which is considerably better than the 26.5 s waiting time produced by traditional emergency power operation as described above.

Figure 6:
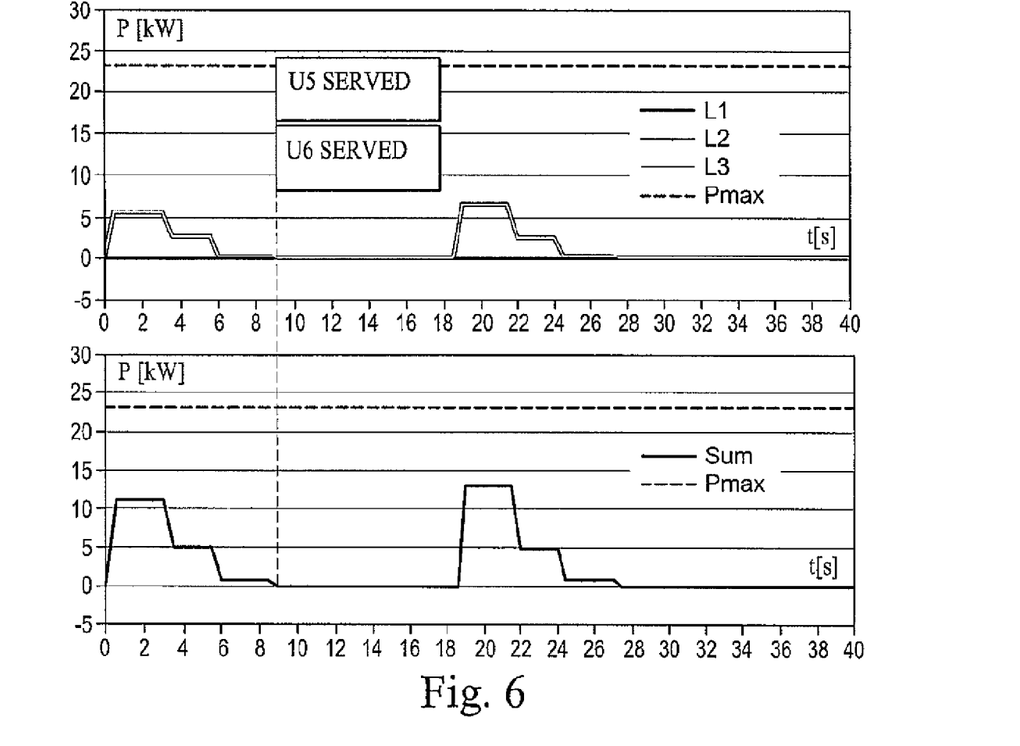
FIG. 6 represents the power requirement in the situation presented in FIG. 5.

FIG. 6 presents a graph of the power requirement of this routing alternative as a function of time. In the example in FIGS. 5 and 6, two elevators can be kept running, so the calls 53, 54 can be served faster than in traditional emergency power operation, and still the capacity of the emergency power generator suffices all the time.

Dynamic elevator operation during emergency power can be implemented on the basis of "genetics", i.e. genetic algorithms as known in prior art. In a cost function representing an elevator group, it is necessary to consider the instantaneous power consumed by the elevators at different stages along their route. The power requirement is affected by car load, car direction, magnitude of car acceleration, constant speed of the car and magnitude of car deceleration, as illustrated in the example presented in Table 2. If at some instant of time t the total power needed by the elevators exceeds the supply power available to the elevator group, then a penal term is added to the cost function of the route alternative to impose a penalty on the route alternative in question. The penal term increases the probability of such an unsatisfactory route alternative being eliminated from the optimization. The cost function is of the form:

$$\overset{max}{\underset{L}{P}} = \max\left(\sum_L P_L(t)\right) \quad (3)$$

$$C = \alpha \cdot C_1 + \beta \cdot C_2 + \ldots + K \cdot \left(\overset{max}{\underset{L}{P}} > \overset{max}{\underset{G}{P}}\right) \cdot P_L^{max}$$

In this equation (3), $C_1$ and $C_2$ are other cost terms, such as e.g. passenger waiting time and traveling time, and α and β are weighting coefficients of the costs. The term $$\overset{max}{\underset{L}{P}}$$

is the peak power requirement of the elevator group over time horizon $t=t_0, \ldots, T$, where T is the instant of time when the elevator system gets rid of both landing calls and car calls. For instance in FIG. 4, $$\overset{max}{\underset{L}{P}} = 27.5$$

kW over the time range of 0.5 s . . . 2 s and T=26 s, which is when the system has finished serving the last car call. The term $$\overset{max}{\underset{G}{P}}$$

is the maximum power available to the elevator system, being 23 kW in our examples. The term $$\left(\overset{max}{\underset{L}{P}} > \overset{max}{\underset{G}{P}}\right)$$

receives the value 1 when $$\overset{max}{\underset{L}{P}}$$

exceeds the available power $$\overset{max}{\underset{G}{P}},$$

otherwise it receives the value 0. Coefficient K can be used to adjust the weight of the penalty caused by exceeding the available power and thus to control its effect in the cost function.

Figure 7:
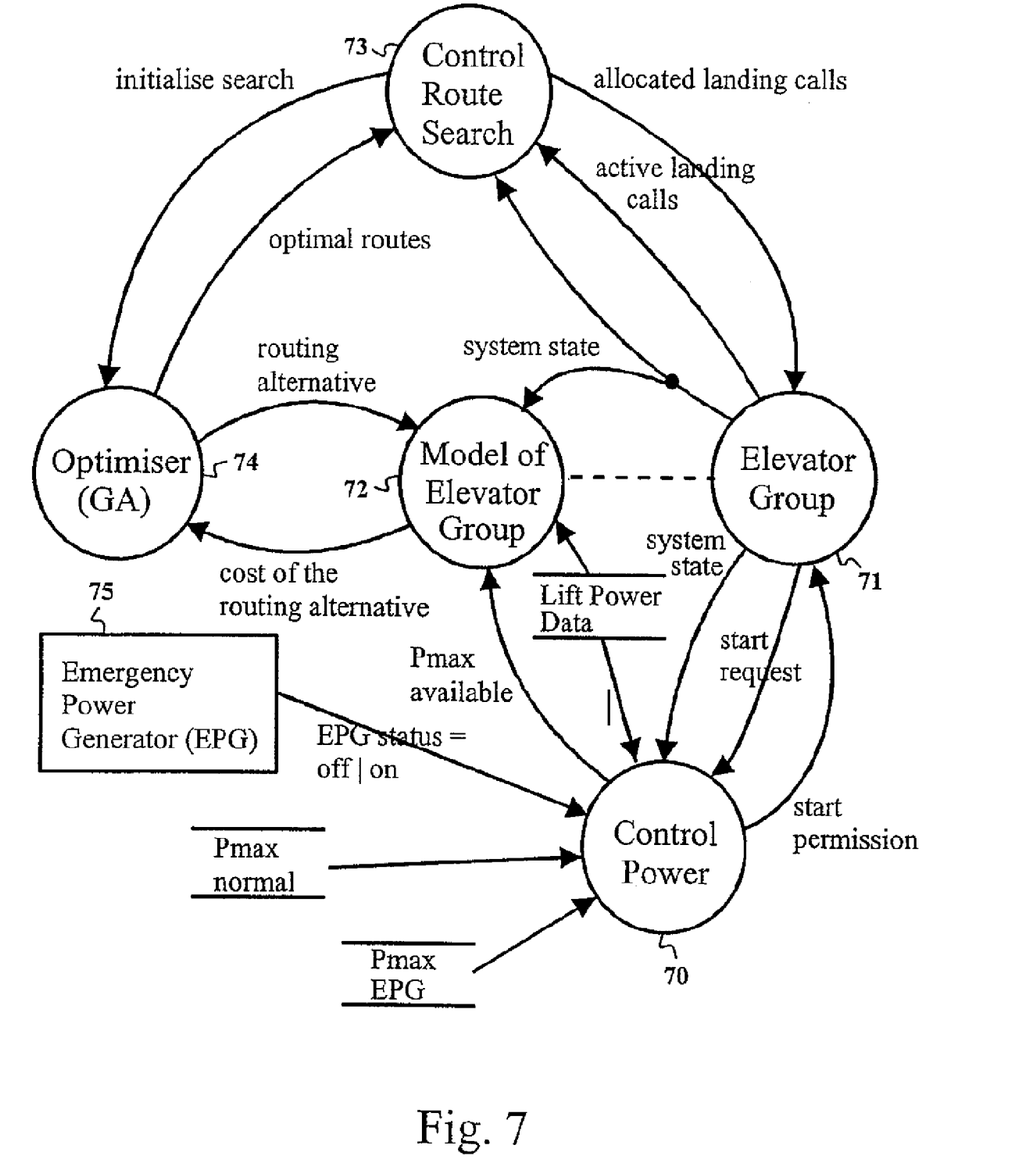
FIG. 7 presents a data flow diagram of the control system according to the present invention.

The basic structure of the system is presented in FIG. 7 as a flow diagram and it follows the basic principles implemented in genetic algorithms. As compared to this basic Gene, a controller of power (Control Power) 70 has been added. It determines the correct peak power for a model 72 of the elevator system and grants start permissions to the elevators in the elevator group 71. FIG. 7 also comprises a so-called controller of route search 73 (Control Route Search), which starts the route search by giving a signal to an optimizer 74. The optimizer 74 again utilizes genetic algorithms and returns the optimal route to the controller 73. The input data to the controller 73 consists of active landing calls not yet allocated and the state of the elevator system. The controller 73 returns information regarding allocation decisions to the elevators 71.

The state of the elevator system 71 is naturally updated to the system model 72 as well. From the optimizer 74, information regarding the route alternative itself is sent to the model 72 and in response to this request the cost data (cost terms) for the route alternative are in turn returned from the model 72 to the optimizer 74.

Connected to the system is an emergency power source 75 (Emergency Power Generator, EPG), which informs the controller 70 as to the on/off state of this power source. The controller 70 of power is also supplied with information regarding the maximum power $P_{max}$ permitted in a normal operating situation and the maximum output power $P_{max,EPG}$ of the emergency power source 75. The maximum power available in each situation is thus inferred in the controller 70 from the supply data and passed to the model 72 of the elevator system. Likewise, the power requirements of the elevators determined beforehand as functions of load and traveling direction (Lift Power Data) are made available both to the model 72 of the elevator system and the controller 70. The controller 70 of power also receives the state of the system directly from the elevators 71.

Power P(t) is a quantity of instantaneous nature, unlike energy consumption, which is cumulative and a time integral of power, $E=\int P(t)dt$. In the search for an optimal routing, the elevator model 72 uses certain assumptions regarding e.g. stopping times. When the elevators 71 then proceed along the planned routes, the actual stopping times may differ from those used in decision-making, in which case the mutual timing of the elevators varies from the original schedule. To avoid overloading in such a situation, the elevator always has to request a start permission from the elevator group control system (in the flow diagram the controller 70 of power) before departure. As the controller 70 of power knows the trips being currently performed by each elevator as well as the associated power consumption, it may grant the elevator a start permission after it has been established that the departure of the elevator in question will not lead to an overload. The elevator may ask for a start permission at the time when it would normally start closing its door. If the elevator does not receive a start permission, the car may be provided with signaling to tell passengers about the delay and that the elevator is waiting for a start permission. The signaling may be acoustic and/or visual. It may be implementing using e.g. an illumined sign saying "Emergency power operation" accompanied by audio information saying e.g. "(pling-plong) Elevator is waiting for start permission". The door remains open during all this time, so that the passengers will not get nervous about this unusual situation. Later, when the overall situation permits, the group control 70 gives the elevator a start permission and the door starts closing. When granting a start permission, the group control 70 naturally takes into account the door closing time.

When implemented according to the example in FIG. 7, the system calculating the routing contains two viewpoints or, in other words, two stages of calculation. As a first aspect, the routing can be planned on a longer-term basis. In other words, this means searching for routes that will result in as short waiting times as possible, yet without exceeding the maximum limit of available electric power. The second aspect in the operation of the system is planning of the routing according to real-time considerations, in other words, elevators are granted running permissions in accordance with the actual situation of overall power consumption of the elevators currently running. These two stages proceed concurrently, because both stages are updated according to traffic situation and changes in the state of the system.

In the method of the present invention, it is essential that the controller 70 of power monitors the power in a piecemeal manner considering it from the time axis, taking into account the various stages of elevator operation. Since acceleration, deceleration and constant speed motion consume different amounts of energy, the controller 70 of power has to take notice when the state of an elevator changes e.g. from constant speed motion to decelerating motion.

As the present invention allows optimization of instantaneous power consumption as well as the energy consumed over a longer period, it is possible to record in the elevator control system after each elevator trip the energy consumed during this trip. This information can be utilized in subsequent route optimizations.

Figure 8:
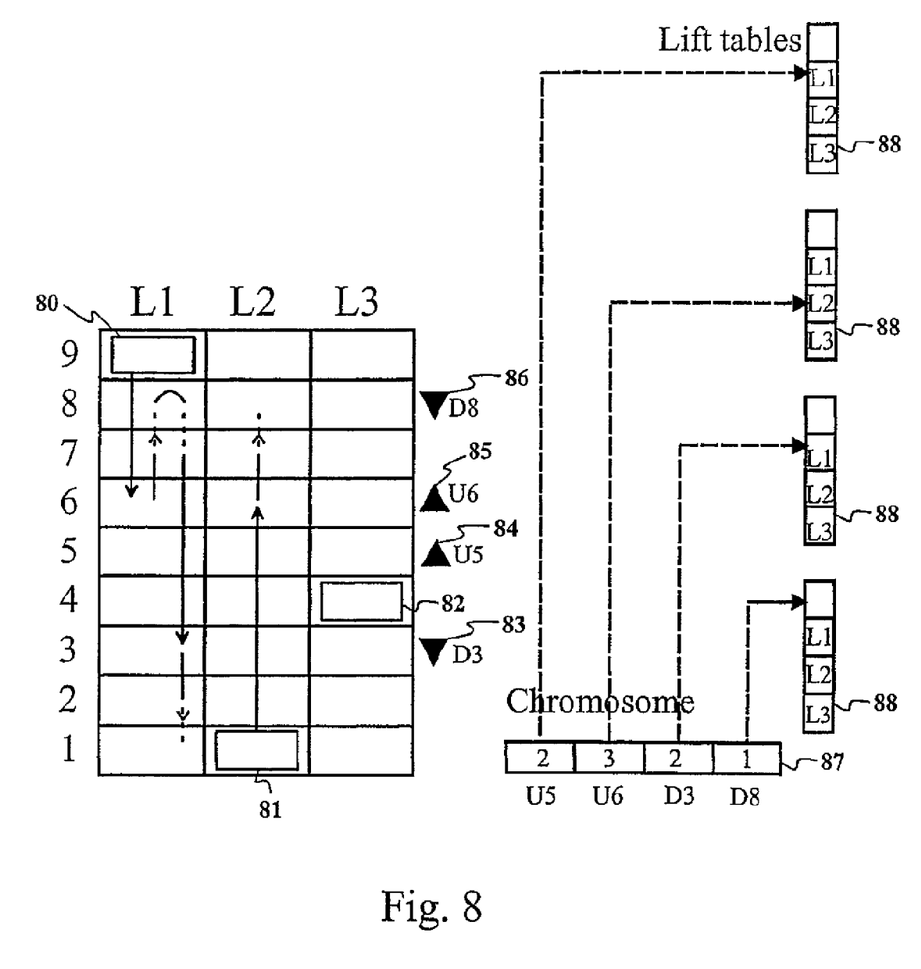
FIG. 8 illustrates the principle of the coding of a chromosome in genetic algorithms used by the present invention.

FIG. 8 illustrates the principle of coding of a chromosome 87. The example system again comprises three elevators, L1 80, L2 81 and L3 82. The first elevator 80 is located at floor 9, the second elevator 81 at floor 1 and the third elevator 82 at floor 4. There are four active calls; a down call on the third floor 83, an up call on the fifth floor 84, an up call on the sixth floor 85 and a down call on the eighth floor 86. From these calls is formed a four-gene chromosome 87, to be used as an instrument in the calculation.

The coding of the genes into the chromosome 87 comprises an additional feature as compared to the basic Gene. The basic principle of the basic Gene is that the position of the gene in the chromosome 87 specifies which call is in question (identifies the call among the whole set of calls active) and the value of the gene indicates the elevator to serve the call. Normally the starting point in the search for a routing is that an elevator has to be found to serve each call. To enable the system to fulfill the power limit requirement, it must be possible to omit one or more calls from the routing. This can be accomplished by adding an "empty" alternative to the lift table 88 pointed to by the gene. To keep the power consumption below the limit, calls can thus be left waiting for later service.

On the basis of optimization, an elevator can be allocated for each gene (call) in the route alternative represented by FIG. 8. In this context, the gene values point to lift tables 88. The call U5 84 of the first gene is served by elevator L1 80. The call U6 85 of the second gene is assigned to elevator L2 81. Call D3 83 will be served by elevator L1 80 after L1 has served its previous up call U5 84. Down call D8 86 again is so far being omitted from the routing. When a call is left without an elevator, there arises the problem of how the waiting time of such a call is to be taken into account in the calculation. One alternative is to add the current active time (time from entry of call to reference instant) of calls not yet served to the waiting or call time predicted for the calls included in the routing. In the example, call D8 86 will be served later as soon as the power limit condition permits it. This will be possible at the latest after the earlier calls have been served.

It is to be noted that the example in FIG. 8 by no means represents the most optimal routing of the elevators in the situation illustrated. The figure only presents one routing procedure to clarify the principle.

The present Gene-elevator group control performs real route optimization based on a model of the elevator group and also provides a possibility to take power limitations into account in optimizing the routing. Since power is an instantaneous quantity, the system must include a real-time procedure for granting start permissions as described above to ensure that the available power will not be exceeded in any circumstances.

A completely new point of view is obtained if the aim is set at reducing the consumed maximum power even during normal operation of the elevator system. If the system can guarantee that a lowered maximum power limit will not be exceeded in any circumstances, in some situations it might even be possible to reduce the size of the main fuses by one step, in which case the owner of the building will save on electricity bills. This could be the situation if the rated elevator group leads to a fuse size that is only slightly above a standard size. For example, the rating can allow for the elevator group a maximum current of 3*31 A, which leads to 3*25 A main fuses. By limiting the maximum power so that the required peak current is e.g. 3*19 A, fuse size 3*20 A will be sufficient, for which the fixed charges are smaller. Generally speaking, peak power is expensive, and the electricity distribution company charges a relatively high price for it. Very probably consumption peaks can be cut via suitable routing without notably impairing the service provided by the elevator group.

The invention is not exclusively limited to the embodiment examples described above; instead, many variations are possible within the scope of the inventive concept defined in the claims.

The invention claimed is:

1. Method for controlling an elevator group when the maximum power consumption is limited, wherein the elevator group comprises at least one elevator and call allocation in the elevator group is controlled by a control system, said method comprising the steps of:

considering on the basis of active calls and the states of the elevators at the instant of consideration a possible route alternative for the elevators;

defining a cost function containing at least one cost term, each of which comprises a quantity relating to the operation of the elevator system;

adding to the cost function a cost term that comprises the instantaneous power consumed by the elevator system;

setting a maximum limit for the power;

allocating elevators to the calls in such a way that the cost function is minimized and that the set maximum power limit will not be exceeded at any instant of consideration in the route alternative; and giving an elevator allocated to a call a start permission from the control system before departure of the elevator, if taking the said elevator into use will not result in exceeding the set maximum power limit.

2. Method according to claim 1, the method further comprising the step of:

defining in the cost function a penal term for a route that at some instant of time exceeds the set maximum limit and wherein the magnitude of the penal term is proportional to the instantaneous maximum power thus consumed.

3. Method according claim 1, the method further comprising the step of:

weighting each term of the cost function with a weighting coefficient.

4. Method according to claim 1, wherein the method utilizes genetic algorithms.

5. Method according to claim 4, the method further comprising the steps of:

defining in a chromosome of the genetic algorithm the gene value as 'empty' when for a call entered no elevator is allocated at the instant considered; and fulfilling the power limitation condition by setting one or more calls into waiting mode by using genes marked as empty and serving the calls set into waiting mode later.

6. Method according to claim 1, the method further comprising the steps of:

determining the power requirement of the elevators as a function of load for both upward and downward travel; and dynamically varying the number of elevators in service according to the traffic situation and the states of the elevators and taking the aforesaid power requirements into account.

7. Method according to claim 1, wherein the quantity related to the operation of the elevator system is call time, waiting time, traveling time or riding time either for one passenger or as an average value for all passengers, or cumulative energy consumption of the elevator system.

8. Method according to claim 1, wherein the cost function is minimized by a boundary condition set for at least one desired quantity.

9. Method according to claim 1, the method further comprising the step of:

applying the method during emergency power operation of the elevator system, when external supply of electric power has been disturbed or interrupted.

10. Method according to claim 1, the method further comprising the step of:

applying the method in a situation where the energy costs resulting from the use of the elevator system are to be reduced.

11. System for controlling an elevator group when the maximum power consumption is limited, said system comprising:

at least one elevator;

a control system for controlling the allocation of calls in the elevator group;

a model of the elevator system;

an optimizer for:

considering a possible route alternative for the elevators on the basis of active calls and the states of the elevators at the instant of consideration; and defining a cost function, wherein the cost function contains at least one cost term, each of which comprises a quantity relating to the operation of the elevator system;

a controller of power for:

adding to the cost function a cost term that comprises the instantaneous power consumed by the elevator system; and setting a maximum power limit;

wherein the optimizer allocates calls to the elevators in such a way that the cost function is minimized and that the set maximum power limit will not be exceeded at any instant of consideration in the route alternative; and the controller of power gives an elevator allocated to a call a start permission before departure of the elevator, if taking the said elevator into use will not result in exceeding the set maximum power limit.

12. System according to claim 11, wherein the optimizer defines, in the cost function a penal term for a route that at some instant of time exceeds the set maximum limit and wherein the magnitude of the penal term is proportional to the instantaneous maximum power thus consumed.

13. System according to claim 11, wherein:

the optimizer weights each term of the cost function with a weighting coefficient.

14. System according to claim 11, wherein the optimizer of the system uses genetic algorithms.

15. System according to claim 14, wherein:

the optimizer defines the value of a gene in a chromosome as 'empty' when a call that has been input is not allocated an elevator at the instant considered; and the controller of power fulfills the power limitation condition by setting one or more calls into waiting mode by using genes marked as empty and serving the calls set into waiting mode later.

16. System according to claim 11, wherein the optimizer determines the power requirement of the elevators as a function of load for both upward and downward travel; and the controller of power dynamically varies the number of elevators in service according to states of the elevators and a traffic situation and taking the aforesaid power requirements into account.

17. System according to claim 11, wherein the quantity related to the operation of the elevator system is call time, waiting time, traveling time or riding time either for one passenger or as an average value for all passengers, or cumulative energy consumption of the elevator system.

18. System according to claim 11, wherein the cost function is minimized using a boundary condition set for at least one desired quantity.

19. System according to claim 11, the system further comprising:

an emergency power source for guaranteeing power supply in a situation where external supply of electric power has been disturbed or interrupted.

20. System according to claim 11, wherein the system is activated in a situation where the energy costs resulting from the use of the elevator system are to be reduced.

* * * * *